United States Patent [19]

Jeffers et al.

[11] 4,131,863
[45] Dec. 26, 1978

[54] CO CHAIN REACTION CHEMICAL LASER

[75] Inventors: William Q. Jeffers, Florissant; Harris Y. Ageno, Manchester, both of Mo.

[73] Assignee: McDonnell Douglas Corporation, St. Louis, Mo.

[21] Appl. No.: 658,497

[22] Filed: Feb. 17, 1976

[51] Int. Cl.² .............................................. H01S 3/00
[52] U.S. Cl. .......................... 331/94.5 G; 331/94.5 P; 331/94.5 PE
[58] Field of Search ................. 331/94.5 G, 94.5 PE, 331/94.5 P; 330/4.3

[56] References Cited
PUBLICATIONS

Jeffers et al., *Applied Physics Letters*, vol. 22, No. 11, Jun. 1, 1973, pp. 587–589.
McFarlane, *Rev. Sci. Instrum.*, vol. 46, No. 8, Aug. 1975, pp. 1063–1065.
Peng, *J. Phys. Chem.*, vol. 78, p. 634, (1974).

*Primary Examiner*—William D. Larkins
*Attorney, Agent, or Firm*—Gravely, Lieder & Woodruff

[57] ABSTRACT

This application concerns the operation of a CO chemical laser fueled by carbon monosulfide (CS) and oxygen. These fuels allow the operation of a chain reaction, one step of which is the laser pumping reaction. The chain reaction mechanism reduces the O-atom requirement and increases the optical performance of the laser. The ratio of vibrationally excited CO molecules to the O-atom feed is at least 1.5.

2 Claims, 3 Drawing Figures

CO CHAIN REACTION CHEMICAL LASER

BACKGROUND OF THE INVENTION

CO chemical lasers using $O/O_2/CS_2$ reactants require the generation of large quantities of atomic oxygen which presents sufficient difficulties to make this system impractical for large scale devices. It is therefore mandatory to develop techniques for fueling the CO chemical laser with reactants which can be practically generated and allow scaling of the CO chemical laser system to high optical energy output. An important advance made in this application is demonstration that a chain reaction mechanism is operative in a $CS/O_2$ fueled CO chemical laser. This mode of operation reduces the requirement for O-atoms.

All previous continuous wave (cw) CO chemical lasers have operated using the $O/O_2/CS_2$ reaction system. The performance of this system has been well-characterized, and a first approximation to the chemical kinetics can be made using the "three-reaction model,"

$$O + CS_2 \rightarrow CS + SO - 21 \text{ kcal}, \tag{1}$$

$$O + CS \rightarrow CO^* + S - 85 \text{ kcal, and} \tag{2}$$

$$S + O_2 \rightarrow SO + O - 5.6 \text{ kcal}. \tag{3}$$

Experimental studes of the $O/O_2/CS_2$ laser confirm that the net effect of these reactions is to produce one excited CO molecule (CO*) for each input O-atom. Thus, the performance and scaling of the $O/O_2/CS_2$ laser are determined to a large extent by the characteristics of the O-atom source. At present there exists no practical, scalable technique for producing large flows of O-atoms or S-atoms, which are equivalent chain reaction initiators.

Co-pending application Ser. No. 648,273 filed Jan. 12, 1976 as a continuation of Ser. No. 473,695 filed May 28, 1974 entitled CHEMICALLY FUELED LASER by Jeffers et al discloses a CO laser in which CS fuel is reacted with O-atoms to produce excited CO. One of the principal objects of this invention is to reduce the requirement for O-atoms and to increase the optical performance of the $O/O_2/CS/CS_2$ chemical laser system.

DETAILED DESCRIPTION

Following in Table No. I is a listing of the various chemical reactions which can occur in a system containing $O/O_2/CS/CS_2$.

TABLE I

Reactions of the $O/O_2/CS/CS_2$ System

Primary Reactions $$O + CS_2 \rightarrow CS + SO - 21 \text{ kcal} \tag{1a.}$$

$$\rightarrow OCS + S \tag{1b.}$$

$$\rightarrow CO + S_2 \tag{1c.}$$

$$O + CS \rightarrow CO^* + S - 85 \text{ kcal} \tag{2.}$$

$$S + O_2 \rightarrow SO + O - 5.6 \text{ kcal} \tag{3.}$$

Termination Reactions $$O + OCS \rightarrow CO + SO \tag{4.}$$

$$S + CS_2 \rightarrow CS + S_2 \tag{5.}$$

$$SO + O + M \rightarrow SO_2 + M \tag{6.}$$

Branching Reactions $$SO + O_2 \rightarrow SO_2 + O \tag{7.}$$

$$CS + SO \rightarrow OCS + S \tag{8.}$$

$$CS + O_2 \rightarrow OCS + O \tag{9.}$$

$$SO + SO \rightarrow SO_2 + O \tag{10.}$$

Application Ser. No. 473,695 has shown that a laser directly fueled with carbon monosulfide (CS) produced a power enhancement over a similar $CS_2$-fueled laser. The explanation for this enhancement was based on kinetic rates and reactive heating produced by the three primary reactions known to occur in this system (Table I, reactions 1, 2 and 3). The source of CS used in Ser. No. 473,695 (a microwave discharge through $CS_2/He$) was capable of producing only relatively small flows of CS with considerable residual $CS_2$, i.e., CS to $CS_2$ mole ratios (r) of about 0.3 or higher and a maximum of about 0.5.

The basis for the present invention is the fact that reactions 2 and 3 of Table I form a chain system, with $CS/O_2$ as the fuel/oxidizer and O- and S-atoms as chain carriers. Thus, with CS fuel, there is the possibility of using the chain reaction to produce many repetitions of the pumping reaction 2 for each chain carrier introduced into the fuel/oxidizer mixture. For later use, an operational definition of the effectiveness of the chain is the chain length defined as, $$\lambda^* = \frac{F_{CO^*}{}^{final}}{F_O{}^{initial} + F_S{}^{initial}} \tag{1}$$

where $F_{CO^*}{}^{final}$ is the flow rate of vibrationally-excited CO at the exit of the laser cavity, and $F_O{}^{initial}$ and $F_S{}^{initial}$ are the flow rates of chain carriers (O-atoms or S-atoms) injected into the $CS/O_2$ mixture to initiate the chain reaction. By this definition, $\lambda^*$ is the average number of cycles of the chain each initial chain carrier (O-atom or S-atom) makes before being lost in some terminating side reaction. Table I also lists the most probable termination and branching steps for the $CS/O_2$ chain, although this is speculative as some of these reactions and their corresponding rates are uncertain. However, reaction 1 is well-studied and represents a definite sink for chain carriers.

Figure 1:
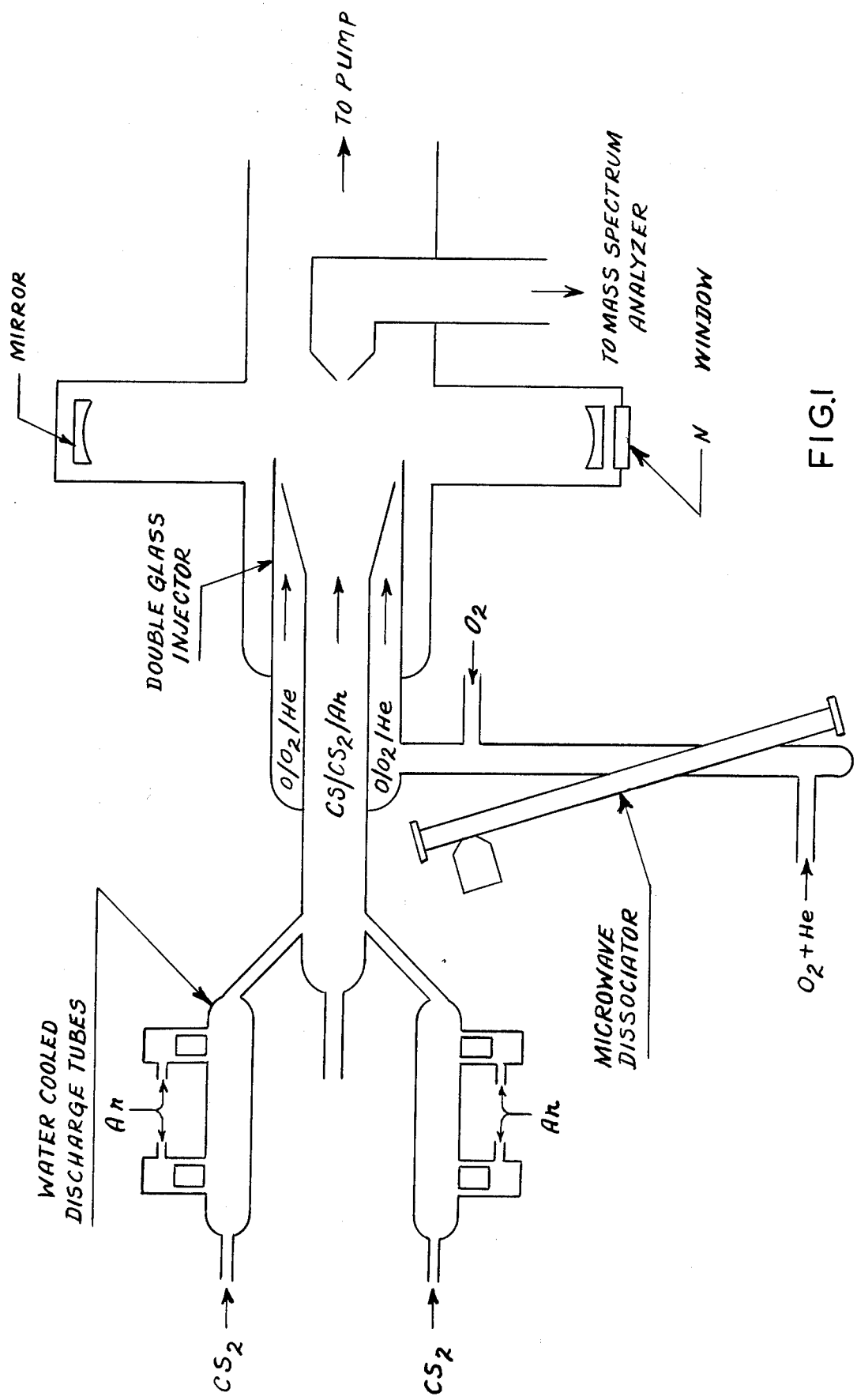
FIG. 1 is a schematic representation of a form of apparatus suitable for use in this invention.

FIG. 1 shows schematically one form of apparatus used in this invention in which the CS is generated by electrical discharge disassociators run with $CS_2/Ar$ input gas.

The double glass injector allows mixing of $CS/CS_2$ with $O/O_2$ in a laser cavity having transverse flow geometry. The glass injector is sized to allow relatively large injector dimensions for the CS flow to minimize the delivery pressure required, and in addition, to minimize the problem of carbon deposition due to CS loss on wall surfaces. The O-atoms were generated by a microwave discharge through $O_2$. A mass spectrometer probe was located about 1 cm downstream of the optical cavity axis to allow continuous analysis of the gas flow exiting the cavity region. Accurate measurement of the input flows to the optical cavity were made. The O-atom flows were measured by $NO_2$ titration, and the $CS/CS_2$ flows were measured with the mass spectrometer. All of these measurements were done in absolute terms by use of timed pressure rise in a known volume. The amount of CO formed by the reaction was measured by the mass spectrometer, properly calibrated in terms of absolute flow rate of CO. A thermocouple probe measured the gas temperature at the mass spectrometer sampling orifice position; the laser output power was measured with a conventional optical power meter.

Figure 2B:
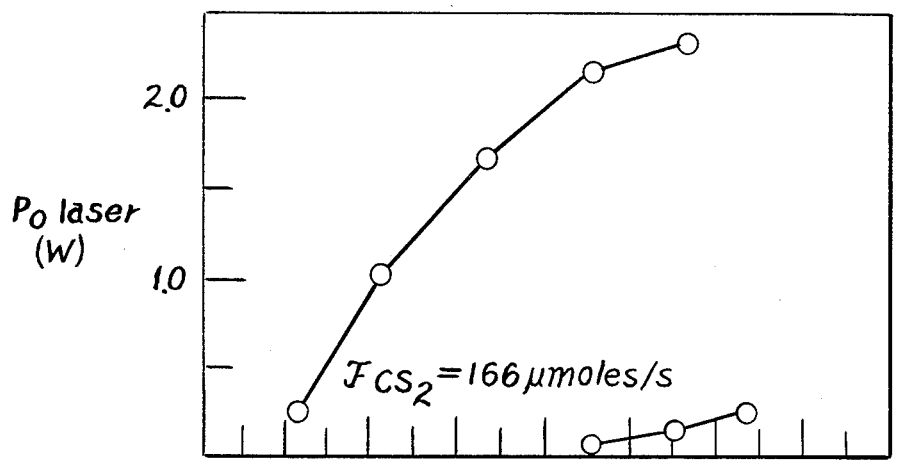
FIGS. 2a and 2b are graphs depicting optical power output and flow rate of vibrationally excited CO as a function of O-atom flow to the system.
Figure 2A:
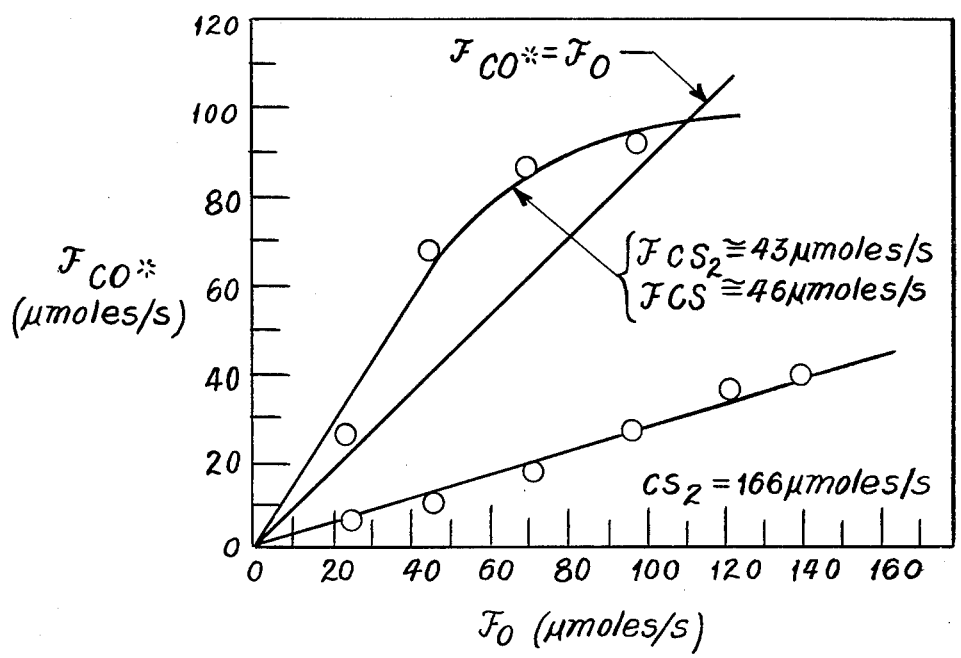

In FIG. 2a and 2b are shown the optical power output and the flow rate of vibrationally excited CO formed by the reactants as a function of the O-atom flow delivered to the optical cavity. All other parameters, including fuel flow rates, were held fixed as the O-atom flow was varied. With $CS/CS_2$ fuel, the electrical discharge disassociators produced cavity flows of 46 micromoles/s of CS and 43 micromoles/s of $CS_2$.

For the $CS/CS_2$ experiments shown in FIG. 2a, $\lambda^* = 1.5$ for low (less than 50 micromoles/s) O-atom flow rates, thus demonstrating an operating chain reaction. ($\lambda^* > 1.0$ implies the operation of a chain mechanism). By comparison, for $CS_2$ fuel at an even higher total fuel flow rate, $\lambda^* = 0.31$ with otherwise identical operating conditions. In the FIG. 2b where the output power of the laser is plotted against the O-atom flow rate, the difference between $CS/CS_2$ fuel and pure $CS_2$ fuel is apparent.

The minimum practical $CS/CS_2$ ratio is at least about 0.2.

The minimum ratio of CO* per O-atom or S-atom introduced is at least about 1.0.

What is claimed is:

1. A method of producing a chain reaction CO chemical laser comprising the steps of
    (a) mixing a CS-containing fuel in which the ratio of $CS/CS_2$ exceeds 0.2 with a stream of $O_2$ oxidizer and O-atom chain initiator such that more than one molecule of vibrationally-excited CO* is produced from a pumping reaction for each O-atom introduced into the mixture and resulting in an inverted population of CO*,
    (b) passing said mixed stream through a resonant optical cavity to obtain continuous stimulated emission of radiation from the CO*, and
    (c) extracting a coherent laser beam from the optical cavity.

2. A method of producing a chain reaction CO chemical laser comprising the steps of
    (a) mixing a CS-containing fuel in which the ratio of $CS/CS_2$ exceeds 0.2 with a stream of $O_2$ oxidizer and S-atom chain initiator such that more than one molecule of vibrationally-excited CO* is produced from a pumping reaction for each S-atom introduced into the mixture and resulting in an inverted population of CO*,
    (b) passing said mixed stream through a resonant optical cavity to obtain continuous stimulated emission of radiation from the CO*, and
    (c) extracting a coherent laser beam from the optical cavity.

* * * * *